(12) United States Patent
Dai Zovi et al.

(10) Patent No.: US 11,593,780 B1
(45) Date of Patent: Feb. 28, 2023

(54) CREATION AND VALIDATION OF A SECURE LIST OF SECURITY CERTIFICATES

(71) Applicant: Block, Inc., San Francisco, CA (US)

(72) Inventors: Dino Dai Zovi, Brooklyn, NY (US); Eric Monti, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 1678 days.

(21) Appl. No.: 14/965,112

(22) Filed: Dec. 10, 2015

(51) Int. Cl.
*G06Q 20/20* (2012.01)
*G06Q 20/38* (2012.01)

(52) U.S. Cl.
CPC ......... *G06Q 20/202* (2013.01); *G06Q 20/206* (2013.01); *G06Q 20/38215* (2013.01); *G06Q 2220/00* (2013.01)

(58) Field of Classification Search
CPC .................................................. G06Q 20/389
See application file for complete search history.

(56) References Cited

U.S. PATENT DOCUMENTS

| | | | |
|---|---|---|---|
| 5,204,902 | A | 4/1993 | Reeds, III et al. |
| 5,241,599 | A | 8/1993 | Bellovin et al. |
| 5,903,652 | A | 5/1999 | Mital |
| 6,105,012 | A | 8/2000 | Chang et al. |
| 6,148,404 | A | 11/2000 | Yatsukawa |
| 6,772,331 | B1 | 8/2004 | Hind et al. |
| 6,925,169 | B2 | 8/2005 | Habu |
| 7,302,564 | B2 | 11/2007 | Berlin |
| 7,333,602 | B2 | 2/2008 | Habu |
| 7,788,491 | B1 | 8/2010 | Dawson |
| 7,929,702 | B2 | 4/2011 | Brown et al. |
| 8,127,345 | B2 | 2/2012 | Gregg et al. |
| 8,254,579 | B1 | 8/2012 | Morgan et al. |

(Continued)

FOREIGN PATENT DOCUMENTS

| | | |
|---|---|---|
| AU | 2020210294 A1 | 8/2020 |
| AU | 2021202106 B2 | 6/2022 |

(Continued)

OTHER PUBLICATIONS

Denning, E.D., "Field Encryption and Authentication", Advances in Cryptology: Proceedings of Crypto, pp. 1-17 (1983).

(Continued)

*Primary Examiner* — John W Hayes
*Assistant Examiner* — Zehra Raza
(74) *Attorney, Agent, or Firm* — Mattingly & Malur, PC

(57) ABSTRACT

Disclosed is a technique for verifying the validity of security certificates received by a mobile device. The technique can involve diverting a security certificate into a secure environment, such as a payment application, by modifying an import address table (e.g., implementing a "hook") that is accessed by the security layer of the mobile device. Once diverted, the payment application can create a copy of the security certificate. The copy may be stored in a list of security certificates that is subsequently uploaded to a payment processing system for authentication. In some embodiments, a checksum is generated for the import address table using a cryptographic hash function. The checksum allows the payment application or the payment processing system to determine whether an unauthorized modification of the import address table is present.

22 Claims, 9 Drawing Sheets

(56) References Cited

U.S. PATENT DOCUMENTS

| | | | |
|---|---|---|---|
| 8,281,998 B2 | 10/2012 | Tang et al. | |
| 8,472,629 B2 | 6/2013 | Hamachi | |
| 8,494,165 B1 | 7/2013 | Monica et al. | |
| 8,788,825 B1 | 7/2014 | Le et al. | |
| 8,811,895 B2 | 8/2014 | Reisgies et al. | |
| 8,874,913 B1 | 10/2014 | Monica et al. | |
| 8,880,881 B2 | 11/2014 | Morel et al. | |
| 8,978,975 B2 | 3/2015 | Barnett | |
| 8,990,121 B1 | 3/2015 | Guise et al. | |
| 9,082,119 B2 | 7/2015 | Ortiz et al. | |
| 9,123,041 B2 | 9/2015 | Reisgies et al. | |
| 9,124,419 B2 * | 9/2015 | Bar-El | H04L 63/166 |
| 9,141,977 B2 | 9/2015 | Davis et al. | |
| 9,324,098 B1 | 4/2016 | Agrawal et al. | |
| 9,519,901 B1 | 12/2016 | Dorogusker | |
| 9,665,867 B2 | 5/2017 | Guise et al. | |
| 9,727,862 B2 | 8/2017 | O'Connell et al. | |
| 9,754,112 B1 * | 9/2017 | Moritz | G06F 21/577 |
| 9,805,370 B1 | 10/2017 | Quigley et al. | |
| 9,898,728 B2 | 2/2018 | Brudnicki et al. | |
| 9,940,612 B1 | 4/2018 | Hamilton et al. | |
| 10,115,137 B2 | 10/2018 | Ceribelli et al. | |
| 10,163,107 B1 | 12/2018 | White et al. | |
| 10,366,378 B1 | 7/2019 | Han et al. | |
| 10,373,167 B2 | 8/2019 | Zovi et al. | |
| 10,475,034 B2 | 11/2019 | Guise et al. | |
| 10,482,247 B2 * | 11/2019 | Aime | G06F 21/564 |
| 10,546,302 B2 | 1/2020 | Zovi et al. | |
| 2002/0035695 A1 | 3/2002 | Riches et al. | |
| 2002/0188870 A1 | 12/2002 | Gong et al. | |
| 2002/0194219 A1 | 12/2002 | Bradley et al. | |
| 2003/0018878 A1 | 1/2003 | Dorward et al. | |
| 2003/0177353 A1 | 9/2003 | Hiltgen | |
| 2004/0094624 A1 | 5/2004 | Fernandes et al. | |
| 2004/0104268 A1 | 6/2004 | Bailey | |
| 2004/0153644 A1 | 8/2004 | McCorkendale et al. | |
| 2006/0083187 A1 | 4/2006 | Dekel | |
| 2006/0084448 A1 | 4/2006 | Halcrow et al. | |
| 2006/0224892 A1 | 10/2006 | Brown et al. | |
| 2007/0067643 A1 | 3/2007 | Zhuk et al. | |
| 2007/0141984 A1 | 6/2007 | Kuehnel et al. | |
| 2008/0016537 A1 | 1/2008 | Little et al. | |
| 2008/0017711 A1 | 1/2008 | Adams et al. | |
| 2008/0244714 A1 | 10/2008 | Kulakowski et al. | |
| 2009/0198618 A1 | 8/2009 | Chan et al. | |
| 2010/0005132 A1 | 1/2010 | Choi et al. | |
| 2010/0017602 A1 | 1/2010 | Bussard et al. | |
| 2010/0165981 A1 | 7/2010 | Kuppuswamy et al. | |
| 2010/0260069 A1 | 10/2010 | Sakamoto et al. | |
| 2010/0325735 A1 | 12/2010 | Etchegoyen | |
| 2011/0030040 A1 | 2/2011 | Ronchi et al. | |
| 2012/0124375 A1 | 5/2012 | Truskovsky et al. | |
| 2012/0143706 A1 | 6/2012 | Crake et al. | |
| 2012/0265685 A1 | 10/2012 | Brudnicki et al. | |
| 2012/0330769 A1 * | 12/2012 | Arceo | G06Q 20/32 705/21 |
| 2013/0023240 A1 | 1/2013 | Weiner | |
| 2013/0119130 A1 | 5/2013 | Braams | |
| 2013/0144792 A1 | 6/2013 | Nilsson et al. | |
| 2013/0173475 A1 | 7/2013 | Lund | |
| 2013/0204793 A1 | 8/2013 | Kerridge et al. | |
| 2013/0227647 A1 | 8/2013 | Thomas et al. | |
| 2013/0268378 A1 | 10/2013 | Yovin | |
| 2013/0268443 A1 | 10/2013 | Petrov et al. | |
| 2013/0328801 A1 | 12/2013 | Quigley et al. | |
| 2013/0332367 A1 | 12/2013 | Quigley et al. | |
| 2014/0032415 A1 | 1/2014 | Lee et al. | |
| 2014/0040139 A1 | 2/2014 | Brudnicki et al. | |
| 2014/0075522 A1 | 3/2014 | Paris et al. | |
| 2014/0158768 A1 | 6/2014 | Ray et al. | |
| 2014/0236824 A1 | 8/2014 | Amaya Calvo et al. | |
| 2014/0237545 A1 | 8/2014 | Mylavarapu et al. | |
| 2014/0241523 A1 | 8/2014 | Kobres et al. | |
| 2014/0279552 A1 | 9/2014 | Ortiz et al. | |
| 2015/0012436 A1 | 1/2015 | Poole et al. | |
| 2015/0032635 A1 | 1/2015 | Guise | |
| 2015/0051960 A1 | 2/2015 | Barbaria et al. | |
| 2015/0199689 A1 | 7/2015 | Kumnick et al. | |
| 2015/0235212 A1 | 8/2015 | Ortiz et al. | |
| 2015/0281236 A1 | 10/2015 | Batta et al. | |
| 2015/0324792 A1 | 11/2015 | Guise et al. | |
| 2016/0063480 A1 | 3/2016 | Ballesteros et al. | |
| 2016/0104155 A1 | 4/2016 | Mcgaugh et al. | |
| 2016/0196559 A1 | 7/2016 | Einhorn et al. | |
| 2016/0307089 A1 | 10/2016 | Wurmfeld et al. | |
| 2016/0307189 A1 | 10/2016 | Zarakas et al. | |
| 2017/0068955 A1 * | 3/2017 | Agarwal | G06Q 20/3829 |
| 2017/0161739 A1 | 6/2017 | Singh et al. | |
| 2017/0278104 A1 | 9/2017 | O'Connell et al. | |
| 2018/0060855 A1 | 3/2018 | Keshan et al. | |
| 2018/0096330 A1 | 4/2018 | Hamilton et al. | |
| 2018/0130051 A1 | 5/2018 | Matthews et al. | |
| 2018/0174131 A1 | 6/2018 | Brudnicki et al. | |
| 2018/0181939 A1 | 6/2018 | Hamilton et al. | |
| 2018/0332016 A1 | 11/2018 | Pandey et al. | |
| 2019/0095968 A1 | 3/2019 | Ceribelli et al. | |
| 2019/0287108 A1 | 9/2019 | White et al. | |
| 2021/0144213 A1 * | 5/2021 | Momchilov | H04L 67/146 |
| 2021/0192507 A1 | 6/2021 | Guise et al. | |

FOREIGN PATENT DOCUMENTS

| | | |
|---|---|---|
| CA | 2 860 757 A1 | 7/2013 |
| CA | 2 948 481 A1 | 11/2015 |
| EP | 2 996 095 A1 | 3/2016 |
| EP | 3 866 092 A1 | 8/2021 |
| JP | 2001-338239 A | 12/2001 |
| JP | 2001-357464 A | 12/2001 |
| JP | 2002-259866 A | 9/2002 |
| JP | 2003-500923 A | 1/2003 |
| JP | 2004-153711 A | 5/2004 |
| JP | 2004-166090 A | 6/2004 |
| JP | 2006-293747 A | 10/2006 |
| JP | 2006-340069 A | 12/2006 |
| JP | 2009-140275 A | 6/2009 |
| JP | 2015-201091 A | 11/2015 |
| JP | 2015-204010 A | 11/2015 |
| JP | 2017-524312 A | 8/2017 |
| JP | 2018-125876 A | 8/2018 |
| KR | 10-2015-0095588 A | 8/2015 |
| WO | 2009/069202 A1 | 6/2009 |
| WO | 2009/107349 A1 | 9/2009 |
| WO | 2013/109370 A2 | 7/2013 |
| WO | 2015/171939 A1 | 11/2015 |
| WO | 2018/063812 A1 | 4/2018 |

OTHER PUBLICATIONS

Denning, R.E.D., "Cryptography and Data Security," Purdue University (1982), pp. 1-199 [Part-1].

Denning, R.E.D., "Cryptography and Data Security," Purdue University (1982), pp. 200-209 [Part-2].

Koch, H.S., et al., "The application of cryptography for data base security," AFIPS National Computer Conference, dated Jun. 7-10, 1976, pp. 97-107.

"Security Requirements for Cryptographic Modules," National Institute of Standards and Technology, FIPS Pub 140-1, on Jan. 11, 1994, pp. 1-69.

Non-Final Office Action dated Dec. 14, 2018, for U.S. Appl. No. 15/282,986, of Hamilton, S., et al., filed Sep. 30, 2016.

Examiner Requisition for Canadian Patent Application No. 2,860,757, dated Jan. 8, 2019.

Office Action for European Patent Application No. 15 789 231.6, dated Jan. 8, 2019.

Menezes, A.J., et al., "Handbook of Applied Cyptography, Motivation for Use of Session Keys, Key Transport Based On Public-Key Encryption, Hybrid Key Transport Protocols Using Pk Encryption," Handbook of Applied Cryptography, CRC Press, pp. 494, 506, 507, 512, 513, 514 & 559 (Jan. 1, 1997).

"Wi-Fi Certified Wi-Fi Direct," Wi-Fi Alliance, published Oct. 2010, Retrieved from the Internet URL: http://www.wi-fi.org/

(56) References Cited

OTHER PUBLICATIONS knowledge-center/white-papers/wi-fi-certified-wi-fi%C2#AEconnect-devices, on Oct. 16, 2012, pp. 1-14.
Non-Final Office Action dated Jan. 18, 2013, for U.S. Appl. No. 13/353,156, of Monica, D., et al., filed Jan. 18, 2012.
Notice of Allowance dated Apr. 2, 2013, for U.S. Appl. No. 13/353,156, of Monica, D., et al., filed Jan. 18, 2012.
Non-Final Office Action dated Jan. 29, 2014, for U.S. Appl. No. 13/353,229, of Morel, S., et al., filed Jan. 18, 2012.
Non-Final Office Action dated Mar. 25, 2014, for U.S. Appl. No. 13/939,629, of Monica, D., et al., filed Jul. 11, 2013.
Notice of Allowance dated Jun. 23, 2014, for U.S. Appl. No. 13/939,629, of Monica, D., et al., filed Jul. 11, 2013.
Notice of Allowance dated Jul. 10, 2014, for U.S. Appl. No. 13/353,229, of Morel, S., et al., filed Jan. 18, 2012.
Non-Final Office Action dated Dec. 5, 2014 for U.S. Appl. No. 14/273,447, of Guise, M.J., et al., filed May 8, 2014.
Notice of Allowance dated Jan. 5, 2015 for U.S. Appl. No. 14/273,447, of Guise, M.J., et al., filed May 8, 2014.
Non-Final Office Action dated Oct. 1, 2015, for U.S. Appl. No. 13/800,610, of Quigley, O.S.C., et al., filed Mar. 13, 2013.
Final Office Action dated Apr. 22, 2016, for U.S. Appl. No. 13/800,610, of Quigley, O.S.C., et al., filed Mar. 13, 2013.
Examiner Requisition for Canadian Patent Application No. 2,860,757, dated Jan. 23, 2017.
Notice of Allowance dated Jan. 27, 2017 for U.S. Appl. No. 14/614,350, of Guise, M.J., et al. filed Feb. 4, 2015.
Non Final Office Action dated Mar. 14, 2017, for U.S. Appl. No. 13/800,610, of Quigley, O.S.C., et al., filed Mar. 13, 2013.
Non-Final Office Action dated May 19, 2017, for U.S. Appl. No. 15/282,943, of Hamilton, S., et al., filed Sep. 30, 2016.
Final Office Action dated Nov. 15, 2017, for U.S. Appl. No. 13/800,610, of Quigley, O.S.C., et al., filed Mar. 13, 2013.
Notice of Allowance dated Dec. 4, 2017, for U.S. Appl. No. 15/282,943, of Hamilton, S., et al., filed Sep. 30, 2016.
Non-Final Office Action dated Dec. 22, 2017, for U.S. Appl. No. 14/273,449, of Guise, M.J., et al., filed May 8, 2014.
Examiner Requisition for Canadian Patent Application No. 2,860,757, dated Feb. 2, 2018.
English-language translation of Decision to Grant a Patent for Japanese Patent Application No. 2017-511546, dated Feb. 23, 2018.
Final Office Action dated Aug. 28, 2018, for U.S. Appl. No. 14/273,449, of Guise, M.J., et al., filed May 8, 2014.
Notice of Allowance dated Sep. 12, 2018, for U.S. Appl. No. 13/800,610, of Quigley, O.S.C., et al., filed Mar. 13, 2013.
International Search Report and Written Opinion for International Application No. PCT/US2012/069897, dated Aug. 26, 2013.
International Search Report and Written Opinion for International Application No. PCT/US2015/029763, dated Jul. 28, 2015.
Extended European Search Report for European Patent Application No. 15789231.6, dated Sep. 8, 2017.
International Search Report and Written Opinion for International Application No. PCT/US2017/051502, dated Dec. 8, 2017.
Notice of Allowance dated May 28, 2019, for U.S. Appl. No. 14/273,449, of Guise, M.J., et al., filed May 8, 2014.
Final Office Action dated Jun. 13, 2019, for U.S. Appl. No. 15/282,986, of Hamilton, S., et al., filed Sep. 30, 2016.
English-language translation of Notice of reasons for refusal for Japanese Patent Application No. 2018-054964, dated Jun. 24, 2019.
Examiner Report No. 1 for Australian Patent Application No. 2015255884, dated Jul. 12, 2019.
Toegl et al., "An approach to introducing locality in remote attestation using near field communications",The Journal of Supercomputing, Kluwer Academic Publishers, Bo, vol. 55, No. 2, Mar. 19, 2010, pp. 207-227.
Notice of Allowance dated Jun. 15, 2020, for U.S. Appl. No. 15/282,986, of Hamilton, S., et al., filed Sep. 30, 2016.
English-language translation of Search Report for Japanese Patent Application No. 2019-517212, dated Apr. 22, 2020.
Examiner Requisition for Canadian Patent Application No. 3038728, dated Apr. 29, 2020.
Summon to Attend Oral Proceedings for EP Application No. 15789231.6 mailed Jun. 5, 2020.
Notice of Acceptance for Australian Patent Application No. 2015255884 dated Jun. 24, 2020.
Notice of Allowance for Canadian Patent Application No. 2,860,757 dated Jan. 29, 2020.
English-language translation of Decision to Grant for Japanese Patent Application No. 2018-054964, dated Jan. 31, 2020.
Notice of Allowance dated Mar. 11, 2020, for U.S. Appl. No. 15/282,986, of Hamilton, S., et al., filed Sep. 30, 2016.
Intention to Grant for European Application No. 15789231.6, dated Dec. 1, 2020.
Final Office Action dated Jan. 19, 2021, for U.S. Appl. No. 15/497,388, of Guise, M.J., et al., filed Apr. 26, 2017.
Advisory Action dated Dec. 14, 2020, for U.S. Appl. No. 15/859,217, of Funk, M., filed Dec. 29, 2017.
Notice of Acceptance for Australian Patent Application No. 2017335584 dated Dec. 18, 2020.
Examiner Requisition for Canadian Patent Application No. 3038728, dated Jan. 18, 2021.
Notice of Grant for Australian Patent Application No. 2015255884 dated Oct. 22, 2020.
Examiner Requisition for Canadian Patent Application No. 3038728, dated Aug. 12, 2022.
Examiner Requisition for Canadian Patent Application No. 2948481, dated Sep. 9, 2022.
Office Action for European Patent Application No. 17772820.1, dated Feb. 19, 2021.
Examination Report No. 1 for Australian Patent Application No. 2020210294, dated Mar. 16, 2021.
Notice of Allowance dated Aug. 11, 2020 for U.S. Appl. No. 15/897,662, of Hamilton, S., et al. filed Feb. 15, 2018.
Non Final Office Action dated Jul. 29, 2020, for U.S. Appl. No. 15/497,388, of Guise, M.J., et al., filed Apr. 26, 2017.
Search Report by Registered Search Organization received for Japanese Patent Application No. 2017-511546, dated Jan. 18, 2018.
Notice of Reasons for Refusal received for Japanese Patent Application No. 2019-517212, dated Jul. 20, 2020.
Final Office Action dated Aug. 27, 2020, for U.S. Appl. No. 15/859,217, of Funk, M. et al., filed Dec. 29, 2017.
Advisory Action dated Aug. 30, 2018, for U.S. Appl. No. 15/282,986, of Hamilton, S., et al., filed Sep. 30, 2016.
Notice of Allowance dated Jan. 16, 2020, for U.S. Appl. No. 15/282,986, of Hamilton, S., et al., filed Sep. 30, 2016.
Non-Final Office Action dated Feb. 25, 2020, for U.S. Appl. No. 15/897,662, of Hamilton, S., et al., et al., filed Feb. 15, 2018.
Restriction requirement dated Feb. 27, 2020, for U.S. Appl. No. 15/497,388, of Guise, M.J., et al., filed Apr. 26, 2017.
Non-Final Office Action dated Mar. 3, 2020, for U.S. Appl. No. 15/859,217, of Funk, M., filed Dec. 29, 2017.
Examination Report No. 1 for Australian Patent Application No. 2017335584, dated Jan. 22, 2020.
Summon to Oral Proceedings mailed Jan. 31, 2020, for EP Application No. 15789231.6 filed on May 7, 2015.
Gumyoji Ekimae School, "Line ID hijacking," dated Sep. 2014, Retrieved from the Internet<URL:http://hello-gumyoji.jugem.jp/?month=201409>, on Jun. 22, 2020, pp. 1-5.
Advisory Action dated Jun. 21, 2021, for U.S. Appl. No. 15/497,388, of Guise, M.J., et al., filed Apr. 26, 2017.
Notice of Allowance dated Mar. 4, 2022, for U.S. Appl. No. 15/497,388, of Guise, M.J , et al., filed Apr. 26, 2017.
English-language translation of Decision to Grant for Japanese Patent Application No. 2019-517212, dated Apr. 9, 2021.
Decision to Grant for European Application No. 15789231.6, dated Apr. 9, 2021.
Examiner Requisition for Canadian Patent Application No. 2948481, dated Apr. 16, 2021.
Notice of Grant for Australian Patent Application No. 2017335584 dated Apr. 22, 2021.
Notice of Acceptance for Australian Patent Application No. 2020210294, dated May 18, 2021.

(56) References Cited

OTHER PUBLICATIONS

Extended European Search Report for European Patent Application No. 21165066.8, dated Jul. 14, 2021.
Notice of Grant for Australian Patent Application No. 2020210294 dated Sep. 9, 2021.
Examiner Requisition for Canadian Patent Application No. 3038728, dated Oct. 5, 2021.
Examiner Requisition for Canadian Patent Application No. 2948481, dated Jan. 6, 2022.
Examination Report No. 1 for Australian Patent Application No. 2021202106, dated Jan. 13, 2022.
Notice of Acceptance for Australian Patent Application No. 2021202106, dated Mar. 2, 2022.
Notice and Certificate of Grant for Australian Patent Application 2021202106, dated Jun. 30, 2022.

\* cited by examiner

CREATION AND VALIDATION OF A SECURE LIST OF SECURITY CERTIFICATES

FIELD OF THE INVENTION

At least one embodiment of the present disclosure pertains to systems and techniques for validating security certificates, and more particularly, to techniques for creating a secure list of security certificates received by a point-of-sale (POS) device during payment transactions.

BACKGROUND

Some merchants initiate payment transactions with consumers by using a mobile POS device belonging to the merchant, such as a smartphone or tablet computer (e.g., Apple iPad or the like). For example, a small, mobile card reader can be plugged into the audio jack of the mobile POS device, and point-of-sale (POS) software can be executed by the mobile POS device to facilitate payment transactions completed using a payment card (e.g., credit card or debit card). The merchant swipes the consumer's payment card through the card reader, and the card reader communicates the card's data to the POS software in the POS device. The POS software can then confirm the authenticity of the card and communicate with a remote payment authorization system to obtain authorization for the transaction.

This type of payment model, however, requires that a number of security-related issues be addressed. For example, cryptographic protocols, such as Secure Sockets Layer (SSL) and Transport Layer Security (TLS), are often used to secure communications transmitted between devices over a computer network. But attackers often attempt to hack these protocols, for example, by installing malicious software ("malware") or transmitting bogus security certificates to a device. Consequently, a problem exists, particularly (though not exclusively) for devices that participate in electronic payment transactions, of how to know that security certificates received by a mobile device are valid and that sensitive information is protected from these threats.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
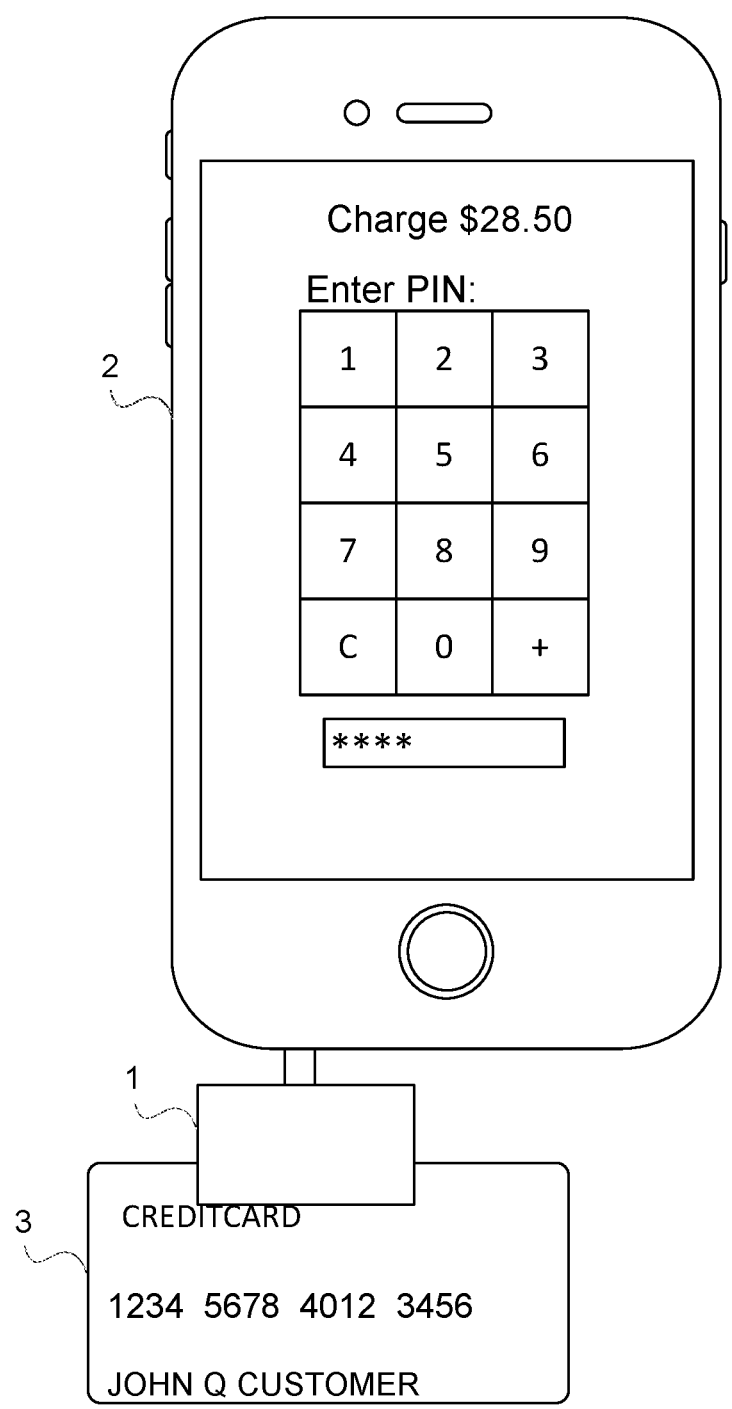
FIG. 1 illustrates an example of a configuration in which a card reader is coupled to a mobile POS device of a merchant.

In this description, references to "an embodiment," "one embodiment," or the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

In a payment transaction involving a card reader connected to a mobile POS device, confidential or sensitive data may be communicated between the POS device and a remote computing system over a computer network. The confidential or sensitive data can include, for example, a passcode, card number, expiration date, card verification value (CVV), etc. In most instances, the computing system is part of a payment authorization system that is able to facilitate payment transactions by validating the data. But the POS device could also be targeted by an attacker that attempts to intercept the data (e.g., by installing malware or providing a bogus SSL certificate) transmitted by the POS device. For example, operating system (OS) libraries and POS device databases are common targets for interference by intra-application (i.e., "in-app") hooking frameworks.

It is desirable, therefore, to determine whether security certificates received by the POS device from other computing devices during payment transactions are valid. Such protection can be provided by, among other things, intercepting security certificates before they are received by an OS-provided library or an OS-supported executable (e.g., a security layer), storing copies of the security certificates (e.g., in a secure environment of the mobile POS device), and uploading the copies to a validation system (which may be part of a payment processing system) for validation. The security certificates can be, for example, Secure Sockets Layer (SSL) certificates and/or Transport Layer Security (TLS) certificates.

More specifically, in accordance with the technique introduced here, a security certificate, upon being received by the POS device, is diverted to a payment application executing in the POS device rather than to the security layer of the main OS of the POS device. This can be accomplished, for example, by modifying the import address table maintained by the OS, which causes a function call to be made to the payment application rather than to the security layer. The payment application is configured to generate a copy of the security certificate and store it in a secure list of certificates received by the POS device. Each of the security certificates within the list may be associated with a different payment transaction conducted on the POS device. Unlike traditional validation systems that maintain a library of security certificates that are validated by trusted certificate authorities, the list only includes copies of those security certificates actually received or "seen" by the POS device. Because the copy is stored within a secure environment, the technique is not vulnerable to attackers who attempt to fool the POS device by disrupting the handshake process.

Some or all of the security certificates in the list are then uploaded to the validation system (e.g., periodically or from time to time) for validation. The validation system analyzes the security certificates and, for any certificates determined not to be valid, performs or triggers a remedial action. For example, the validation system may disable the payment application in the POS device, prevent any further transactions with the computing device responsible for transmitting the invalid certificate, notify the merchant, etc. Unlike traditional validation techniques, the technique introduced herein validates security certificates received by a mobile device within a secure environment (e.g., a validation system distinct from the POS device). Moreover, the technique allows threats to sensitive information, such as financial information necessary for electronic payment transactions, to be more readily and effectively identified.

Accordingly, introduced here is a technique for generating a secure list of security certificates that have been used to facilitate completion of various payment transactions on the POS device. A trusted payment module executed in the POS application is preferably used to intercept the security certificates before being received and validated by the security layer of the OS. The trusted payment module may be software, such as a part of the payment application, as henceforth assumed in this description to facilitate explanation. Note, however, that the trusted payment module could alternatively be dedicated hardware, such as an integrated circuit (IC) chip or chipset in the POS device, or a combination of software and dedicated hardware.

Upon receiving a security certificate, the OS-enabled security layer of the POS device is traditionally configured to compare the certificate to a library of trusted certificates and place a function call to a handshake function that allows the POS device to authenticate itself and establish a secure connection with another device. Here, however, the security layer of the POS device is configured to divert a security certificate that has been received from another computing device to the certificate management module of the payment application upon receiving the certificate. Rather than place a function call to the handshake function supported by the OS as would typically occur, the security layer instead places a function call to the secure application code. This can be accomplished by modifying the import address table accessed by the security layer. More specifically, a function "hook" can be implemented in the import address table. "Hooking," as referred to herein, covers a range of techniques used to alter the behavior of software (e.g., the security layer of the OS) by intercepting a function call that is passed between software components. The modified code that handles the intercepted function call is called a "hook." Other interposition techniques could also be used, such as direct manipulation of shared data structures or by placing triggered events directly into the application event queue.

The payment application is able to generate a secure list of security certificates, which can be subsequently analyzed to determine whether any of the certificates are unauthorized and invalid. In some embodiments, the payment application is configured to transmit the list of security certificates to a payment processing system for validation upon the expiration of a predetermined duration of time or receipt of an upload request input at the POS device or payment processing system.

In some embodiments, the payment application is communicatively coupled to a payment processing system operated by a payment processing entity. The payment processing system can be configured to facilitate processing of the payment transaction between the merchant and a consumer. For example, the payment processing system may maintain one or more accounts for the consumer, where each account is associated with a different payment card (e.g., credit card, debit card). Further yet, the payment processing entity may not be the issuer of some or all of the payment cards involved in the transactions that it facilitates; for example, the payment processing entity may be a business entity, which is not necessarily a payment card issuer, dedicated to facilitating card based payment transactions. As another example, the payment processing system may be configured to validate security certificates transmitted by the POS device. If any of the security certificates is determined to be invalid (i.e., unauthorized), the payment processing system can identify the invalid certificate as a candidate for further analysis, flag the responsible computing system as an attacker, prevent receipt of any additional security certificates from the responsible computing system, etc.

A certificate management module (or some other part of the payment application) may also be configured to generate a checksum of at least a portion of the modified import address table maintained by the OS. For instance, the portion may include only those function address references that are used in combination with sensitive information or are considered most vulnerable to an attack (e.g., by malware). The checksum can be generated using any cryptographic hash function, such as an MD5 message-digest algorithm. In some embodiments, the certificate management module is also configured to identify and remap those function address references in the import address table that have been randomly arranged by address space layout randomization (ASLR), a security technique employed to protect against buffer overflow attacks. The checksum, which allows the payment application and/or payment processing system to determine whether the import address table includes an unauthorized modification, is generally more reliable in highly homogeneous runtime environments, such as Apple iOS. Homogeneous runtime environments are those environments that share many of the same fundamental runtime characteristics.

FIG. 1 illustrates an example of a configuration in which a card reader 1 is coupled to a mobile POS device belonging to a merchant. Together, the card reader 1 and POS device 2 are able to facilitate completion of payment transactions that involve payment cards (e.g., credit cards, debit cards). While the illustrated POS device 2 is a smartphone, it could instead be a tablet, personal computer, etc. The card reader 1 can plug into a standard connector of the POS device 2, such as an audio jack or micro-USB port. Alternatively, the card reader 1 may connect to the POS device 2 wirelessly (e.g., via a Bluetooth connection). A payment card 3 can then be read by swiping the card 3 through the card reader 1. The term "swipe" as used herein refers to any manner of triggering the card reader 1 to read data from the payment card 3, such as by passing a card into or through a magnetic stripe card reader, optical scanner, smartcard (i.e., card with an embedded IC chip) reader, radio frequency identification (RFID) reader, or the like.

Figure 2A:
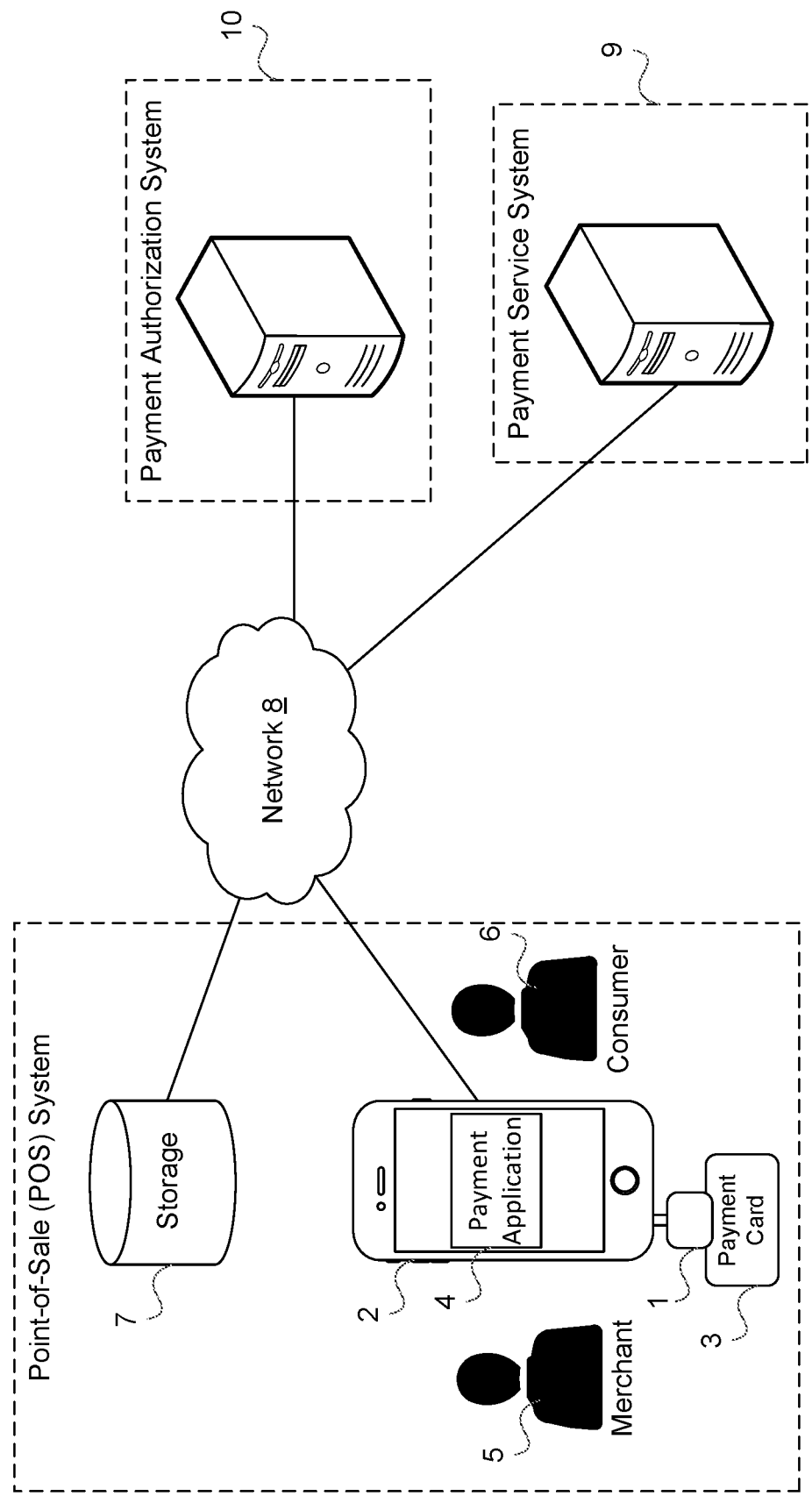
FIGS. 2A and 2B depict network environments in which the POS device communicates with a payment authorization system and an attacker, respectively.
Figure 2B:
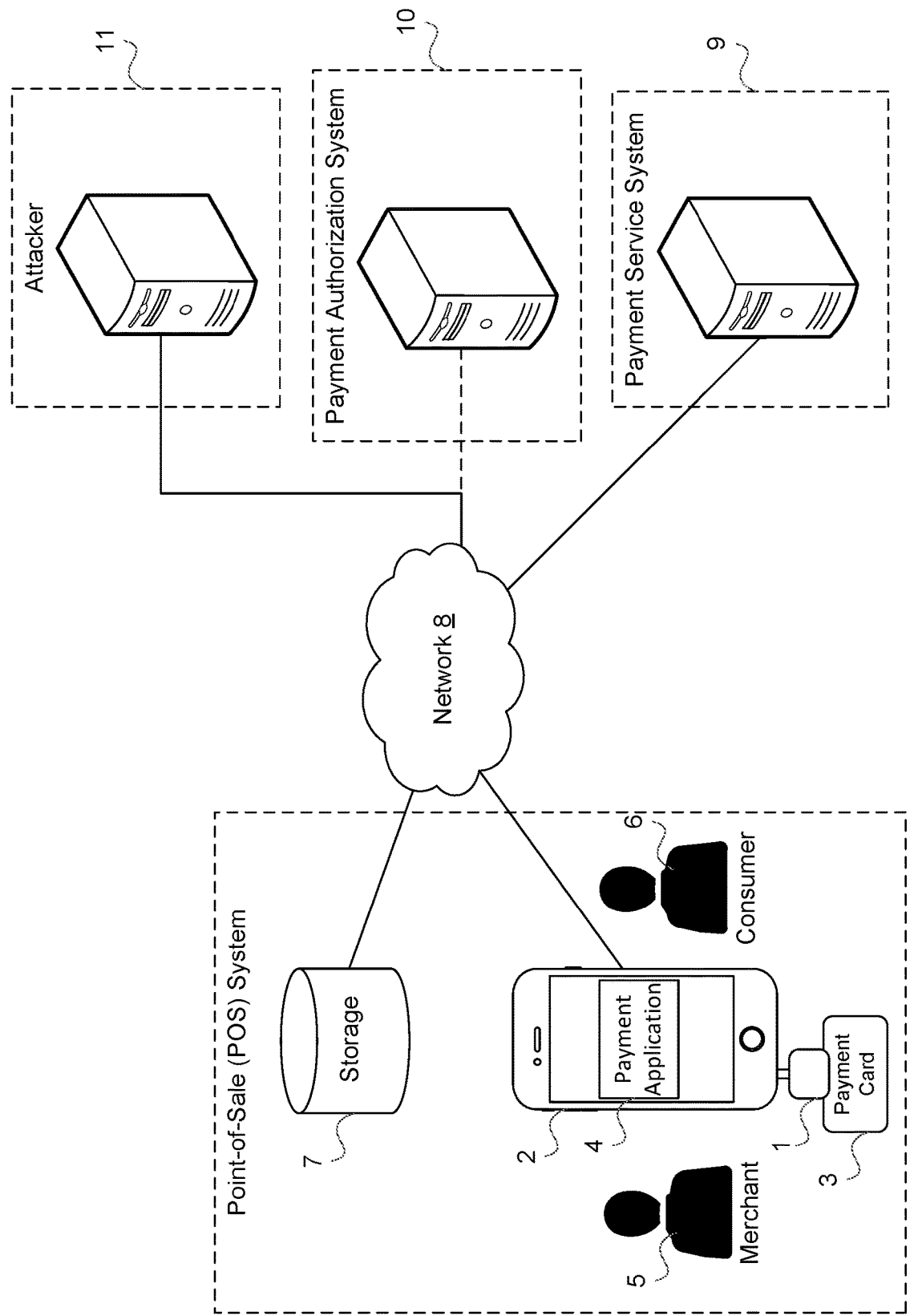

FIGS. 2A and 2B, meanwhile, depict network environments in which the POS device 2 can operate. When a payment transaction is to be completed, the merchant 5 initiates the payment application 4 on the POS device 2. In response, the payment application 4 is executed by the POS device 2 and causes the display to present a user interface that allows the merchant 5 and consumer 6 to complete the transaction.

Many payment transactions require the POS device 2 to exchange confidential or sensitive information with another computing system. For example, once card data has been read from the card 3, it can be passed by the card reader 1 to the payment application 4, which is able to forward the card data along with other information about the payment transaction (e.g., transaction amount, date and time, merchant identification) to a remote payment authorization system 10 to request authorization of the payment. As another example, a personal identification number (PIN) may be provided to the card reader 1, which could compare it against PIN data read from the card 3. A payment processing system 9 may be in the transaction path between the POS device 2 and the payment authorization system 10. The payment authorization system 10 may include multiple business entities and multiple computers and/or other devices. For example, the payment authorization system 10 may include one or more banks and/or other financial institutions, including a payment card issuer, an acquirer, a credit card network (e.g., Visa or MasterCard), etc. As described below, various protocols, such as SSL and TLS, can be used in an effort to secure communications transmitted over a computer network 8 between the POS device 2 and the payment authorization system 10.

FIG. 2B depicts an environment where an attacker 11 has begun intercepting sensitive information transmitted by the POS device 2. The transaction message flow bypasses the payment authorization system 10 and is diverted to a computer system (e.g., a server) controlled by the attacker 11. This could be accomplished by, among other things, installing malware on the POS device that executes within the POS application 4 and causes sensitive data to be redirected or providing a bogus security certificate that fools the POS device 2 and payment application 4 into believing the attacker 11 is a validated computing system.

Figure 3:
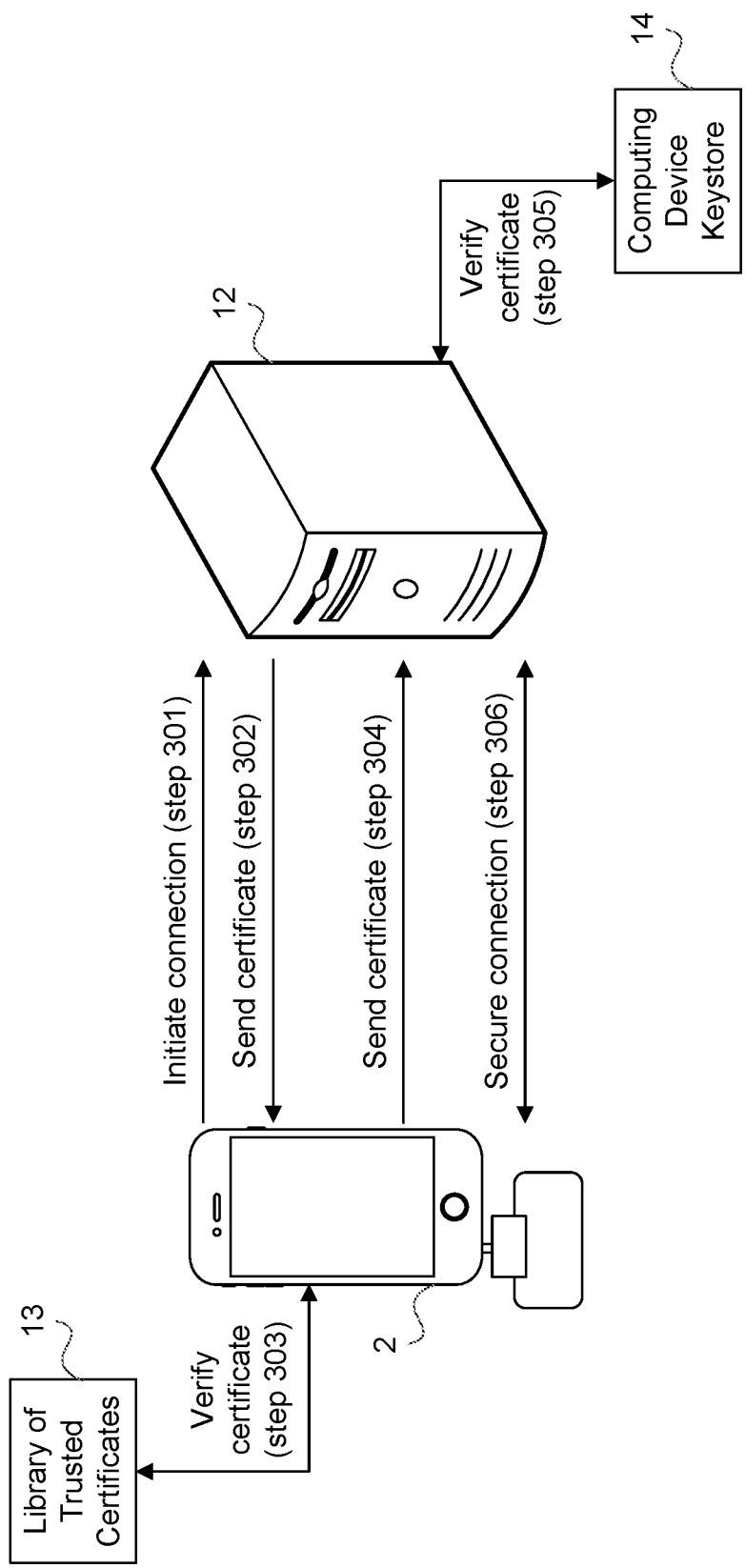
FIG. 3 illustrates a conventional SSL authentication process.

FIG. 3 illustrates a conventional authentication process between the POS device 2 and a remote server computer 12. First, the POS device 2 initiates a connection with the remote server computer 12 (e.g., to request authorization of sensitive financial information) (step 301). The remote server computer 12 then responds by sending the POS device 2 its security certificate for authentication (step 302). The security certificate is an electronic document that includes, for example, a copy of the computing device's public cryptographic key and digital signature. The POS device 2 is able to verify the certificate by comparing it against a library of certificates 13 belonging to validated (i.e., trusted) certificate authorities (step 303). For example, the security certificate may be passed to a security layer 18 supported by the OS libraries that compares the certificate against the library of certificates 13. In some embodiments, the POS device 2 sends its own security certificate to the remote server computer 12 upon establishing the validity of the received security certificate (step 304). The remote server computer 12 may be configured to verify the certificate by comparing the cryptographic key and/or digital signature included in the certificate with a store of keys 14 (step 305). Finally, the remote server computer 12 and POS device 2 are able to securely transmit sensitive information between one another using an encryption scheme established through exchange of the security certificates (step 306).

For example, the payment application 4 may attempt to transmit sensitive financial information (e.g., cardholder name, card/account number, expiration date) to the remote server computer 12 for validation. Once the information has been received by the remote server computer 12 and the transaction has been authorized, the remote server computer 12 may transmit a notification to the POS device 2 indicating that the payment transaction has been authorized. Oftentimes, other information (e.g., information read from the card 3 by the card reader 1) is also used to complete the transaction. But this process is vulnerable to attackers who are able to fool the POS device 2 and/or payment application and disrupt the traditional handshake process.

Figure 4:
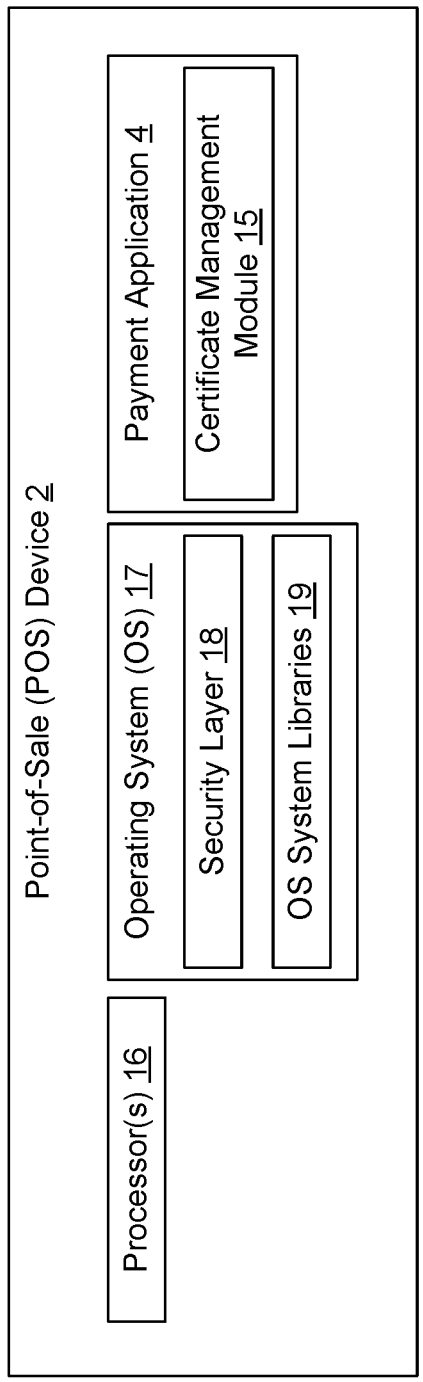
FIG. 4 illustrates an embodiment of the POS device.

FIG. 4 illustrates one example embodiment of the POS device 2. Note that certain components that are not germane to this description may not be shown. The POS device 2 depicted here includes one or more processors 16, a main OS 17, and a payment application 4. The display can be, for example, a touch-sensitive display ("touchscreen") or a traditional non-touch display (in which case the POS device 2 likely also includes a separate keyboard or other input device). The OS 17 includes a series of libraries 19 that can be called by the payment application 4 and a security layer 18 that manages authentication of security certificates (e.g., SSL certificates) and the handshake process necessary to establish a secure connection between the POS device 2 and another device, such as the remote server computer 12.

In accordance with the technique introduced here, the POS device 2 includes a certificate management module 15 that communicates with the OS 17 via the security layer 18 and the payment application 4. The certificate management module 15 may also communicate with other components of the OS 17, such as the system libraries 19. The certificate management module 15 can be software, hardware, or a combination thereof. As illustrated by FIG. 4, the certificate management module 15 can operate as an integral part of the payment application 4. However, the certificate management module 15 could also be logically separate from the payment application 4. In some embodiments, the certificate management module 15, payment application 4, or both are hosted and/or executed at least partly by a card reader 1 coupled to the POS device 2.

Rather than validate the security certificate using the library of trusted certificates 13, the payment application 4 is configured to prevent the security certificate from being initially handled by the OS 17 (e.g., using the OS libraries 19 and/or library of trusted certificates 13). More specifically, the certificate management module 15 is configured to generate copies of security certificates received by the POS device 2 and to upload those copies to a remote validation system (e.g., payment processing system 9) for validation. Thus, each security certificate received by the POS device 2 is preferably validated at least twice: (1) when the security certificate is validated against the library of trusted certificates 13 by the security layer 18 of the OS 17 in the POS device 2; and (2) when the security certificate is uploaded to the remote validation system. This allows the validity of the security certificate to be established even if the security of the POS device 2 has been compromised.

Figure 5:
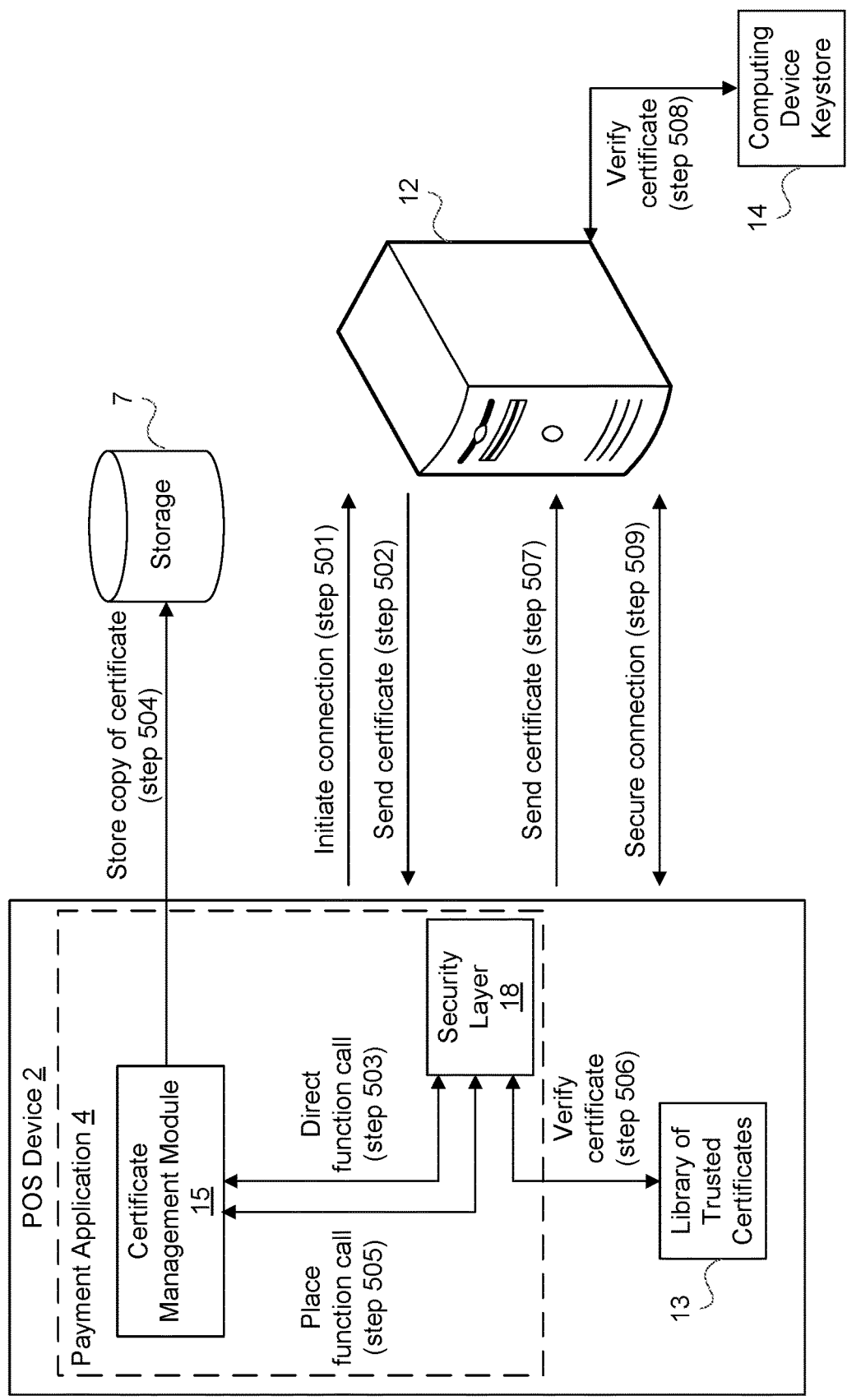
FIG. 5 illustrates an SSL authentication process in accordance with the technique introduced here.

FIG. 5 illustrates an authentication process in accordance with the technique introduced here. First, the POS device 2 initiates a connection with the remote server computer 12 (e.g., to request sensitive information) (step 501). The remote server computer 12 then responds by sending the POS device 2 its security certificate for authentication (step 502). The security certificate may be necessary to complete a payment transaction on the POS device 2.

Upon the POS device's receiving the security certificate, a function call is directed from the security layer 18 of the POS device 2 to the payment application 4 rather than to a security handshake function (step 503). The security layer 18 can be an SSL layer or a TLS layer, for example. As illustrated in FIG. 5, the function call may be directed to a particular module of the payment application 4, such as a certificate management module 15. This can be accomplished, for example, by modifying portion(s) the main executable (e.g., the import address table) of the payment application that are accessed by the security layer 18. The modified code can cause the security certificate to be redirected to the certificate management module 15. The modified code could, for example, be a "hook" or another interposition technique. The payment application 4 is able to store a copy of the security certificate in a list (step 504). The list could be stored on the POS device 2, card reader 1, a cloud-based storage 7, or the like. Another function call is then placed from the payment application 4 to the security layer 18 that sends the security certificate to the security layer 18 (step 505).

Reception of the security certificate allows the security layer of the POS device 2 to complete the verification process as would conventionally occur. As described above, the POS device 2 is able to verify the certificate by comparing it against a library of certificates 13 belonging to validated (i.e., trusted) certificate authorities (step 506). In some embodiments, the POS device 2 sends its own security certificate to the remote server computer 12 upon establishing the validity of the received certificate (step 507). The remote server computer 12 may be configured to verify the security certificate belonging to the POS device 2 by comparing the cryptographic key included in the certificate with a store of keys 14 (step 508). Finally, the remote server computer 12 grants access to the POS device 2 and a secure connection is established, which allows the POS device 2 to transmit sensitive information to the remote server computer 12 for authentication (step 509).

Figure 6:
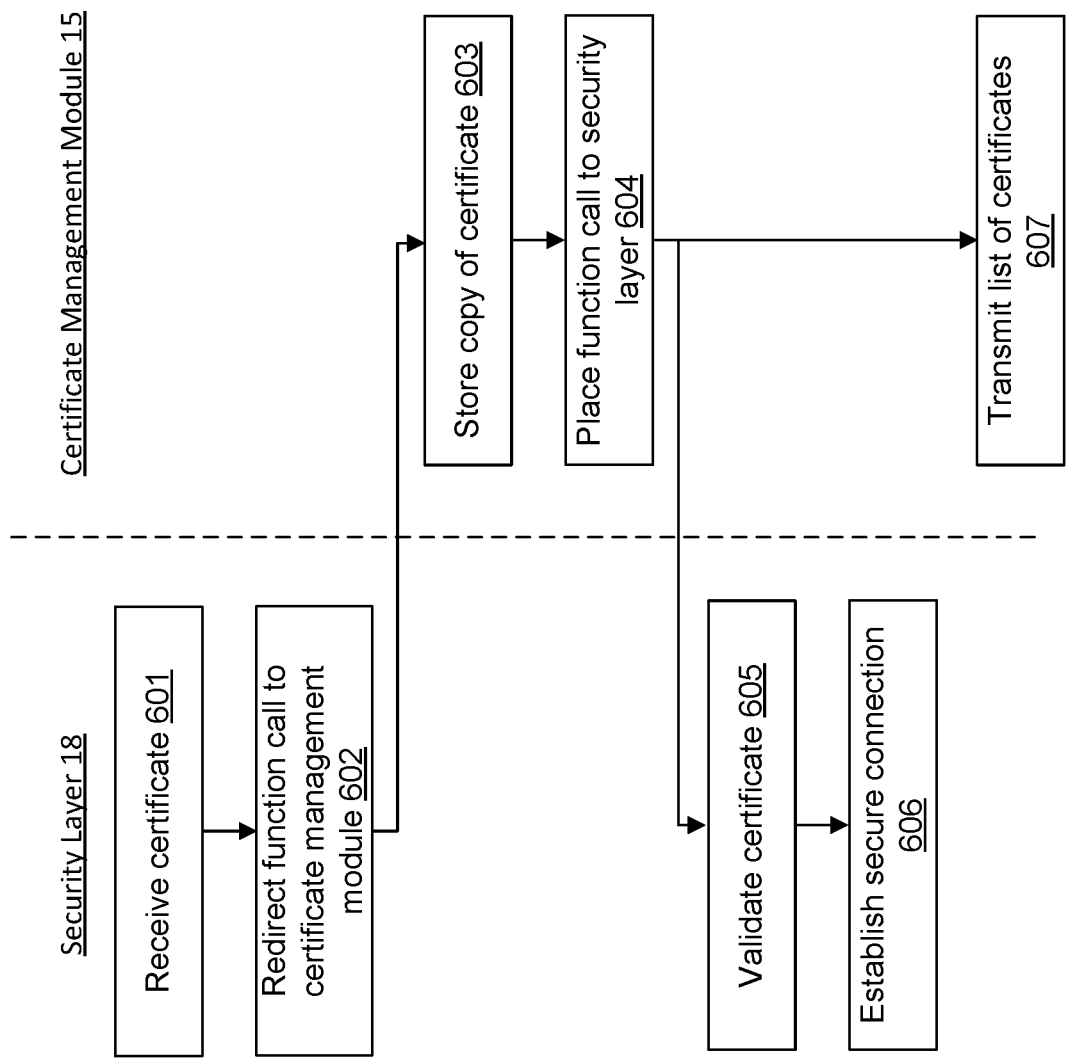
FIG. 6 shows a process in which the payment application creates a secure copy of a security certificate for subsequent validation.

FIG. 6 shows a process by which a secure list of received security certificates is created by a payment application 4, and more specifically, by a certificate management module 15 of a payment application 4 in a POS device 2. The security layer 18 initially receives a security certificate from a remote server computer 12 (e.g., a network-accessible server) that is necessary to establish a secure connection (step 601). The secure connection could be established in the context of a payment transaction to exchange sensitive information that must be authenticated to complete the payment transaction. For instance, the security certificate may be received upon establishing a connection with a remote server computer 12 that is part of a payment authorization system 10. As described above, the remote server computer 12 can operate as a part of a payment authorization system 10, although it could instead be an environment controlled by an attacker 11. Once the certificate is received, the security layer 18 redirects the certificate to the certificate management module 15 of the payment application 4 (step 602). This could be accomplished by modifying the import address table that is accessed by the security layer 18 while authenticating security certificates and establishing secure connections. The import address table may be modified by at application startup time by the payment application 4 (e.g., the certificate management module). Other interposition techniques could also be used. For example, the certificate management module 15 may cause direct manipulation of shared data structures or, after creating and storing a copy of the security certificate, the certificate management module 15 could trigger an action by placing an input directly within the application event queue of the OS. Modified code (i.e., a "hook) can be implemented within the import address table initialized by the OS that intercepts a call to a handshake function and redirects the security certificate to the certificate management module 15 when the import address table is accessed by the security layer 18 of the POS device 2.

The certificate management module 15 is configured to store a copy of the received certificate in a data structure (step 603). The data structure can be stored in the POS device 2, card reader 1, or a cloud-based storage 7. The data structure preferably includes only those security certificates received by the POS device 2 during payment transactions. Each security certificate, meanwhile, represents a connection formed with a different remote server computer 12. After storing the copy of the certificate, the certificate management module 15 places a function call to the security layer 18 that sends the certificate to the security layer 18, which allows the security layer 18 to begin the conventional authentication process (step 604).

Once the security certificate has been received, the security layer 18 completes the authentication process by validating the certificate (step 605) and establishing a secure connection between the POS device 2 and the remote server computer 12 (step 606). The certificate management module 15 of the payment application 4 is configured to transmit the list of certificates (e.g., to a payment processing system) in response to an event or predetermined input (step 607). The event can be, for example, expiration of a predetermined duration of time, an upload request input at the POS device or received from the payment processing system, reception of a new security certificate, the number of certificates in the list reaching a predetermined value, the storage facility that stores the certificates reaching a specified fraction of its maximum capacity, etc. Alternatively, the certificate management module 15 may be configured to transmit a copy of each security certificate as the certificate is received, thereby eliminating the need to create and store certificates. A payment processing system 9 is able to analyze the security certificates and determine whether any of the certificates is invalid. If a certificate is found to be invalid (i.e., unauthorized), the payment processing system 9 can indicate the security of the POS device has been compromised (e.g., by generating a notification) and that additional action(s) may be necessary to address the threat.

Figure 7:
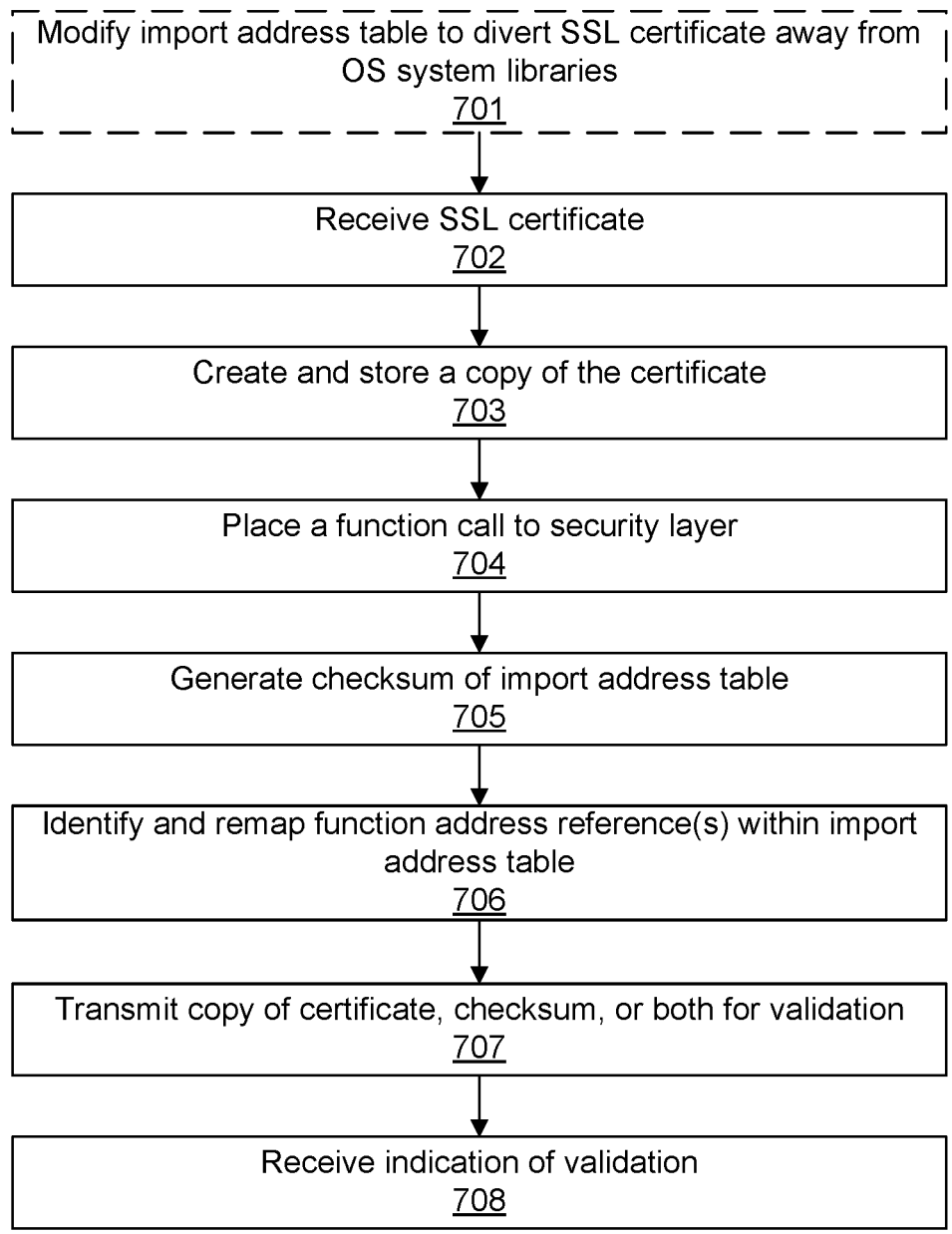
FIG. 7 depicts a process in which the payment application facilitates validation of received security certificates.

FIG. 7 depicts a process in which the payment application 4 facilitates validation of a security certificate. As described above, code within the main executable (e.g., the import address table initialized by the OS) is modified to cause interception/redirection of security certificate received by the POS device 2 while completing a payment transaction (step 701). This technique causes security certificates to initially be invisible to the security layer 18 and libraries 19 of the OS 17. The certificate management module 18 subsequently receives the certificate (step 702) and creates a copy of the certificate (step 703) that could be stored in, for example, a list of received SSL certificates. A function call is then placed to the security layer 18 that allows the security layer 18 to receive the now visible security certificate (step 704).

In some embodiments, as illustrated in FIG. 7, the payment application 4 also generates a checksum of the import address table, which can subsequently be checked (by the payment application 4 or another entity) to determine whether an attacker has attempted to implement an unauthorized modification of the import address table (step 705). The checksum can be generated and checked periodically or on-demand (e.g., upon receiving a command from the payment processing system 9). The checksum can be generated by traversing and processing all of the imported functions for a given executable file at runtime after the dynamic loader has performed dynamic linking between libraries. The dynamic loader is part of the OS 17 that loads and links the libraries needed by the given executable file when executed by copying library content from persistent storage to random access memory (RAM) and relocating function address references. Once the loader is done with the linking, a normal runtime includes function addresses mapped to specific imported libraries. A modified runtime, however, will have a different signature since the altered function address(es) used as inputs will deviate from what is expected.

The checksum can be generated across all loaded programs or some subset of loaded programs, including the main executable of the payment application 4. There may be instances where only specific files or programs (e.g., those that handle sensitive financial information) are included in the checksum. However, the checksum is preferably applied across the entire runtime environment. In some embodiments, a checksum is generated for each specific build of the payment application running on a given POS device. Moreover, a back-end system, such as the payment processing system 9, may be able to gather the checksum values from numerous POS devices that are known to indicate an attacker has tampered with the runtime environment. This back-end system can be trained (e.g., using various machine learning techniques) to identify anomalous checksum values with little or no manual intervention.

The payment application is generally able to determine more consistently and reliably whether an unauthorized modification of the runtime environment is present based on the checksum when the main OS 17 is highly homogeneous. The checksum can be generated by using any cryptographic hash function, such as an MD5 message-digest algorithm, although circumstances may dictate a particular hash function is necessary or desirable. To generate reliable checksum values, the payment application in the illustrated process flow also identifies and remaps one or more function address references within the import address table that have been randomly arranged by ASLR (step 706). ASLR randomly arranges the address space positions of key areas of a process to prevent an attacker from reliably jumping to, for example, an exploited function in memory. Therefore, the address space positions must be remapped to their original locations for the checksum value to accurately identify modification(s) to the import address table.

The payment application also transmits the copy of the security certificate, the checksum, or both to one or more external systems for validation (step 707). For example, the copy of the certificate and the checksum could be transmitted to the payment processing system 9. The payment application 4 subsequently receives an indication the security certificate and/or checksum has been verified (step 708). Reception of the indication, which specifies whether the security of the POS device 2 has been compromised, may be required before the payment transaction is allowed to be completed.

Figure 8:
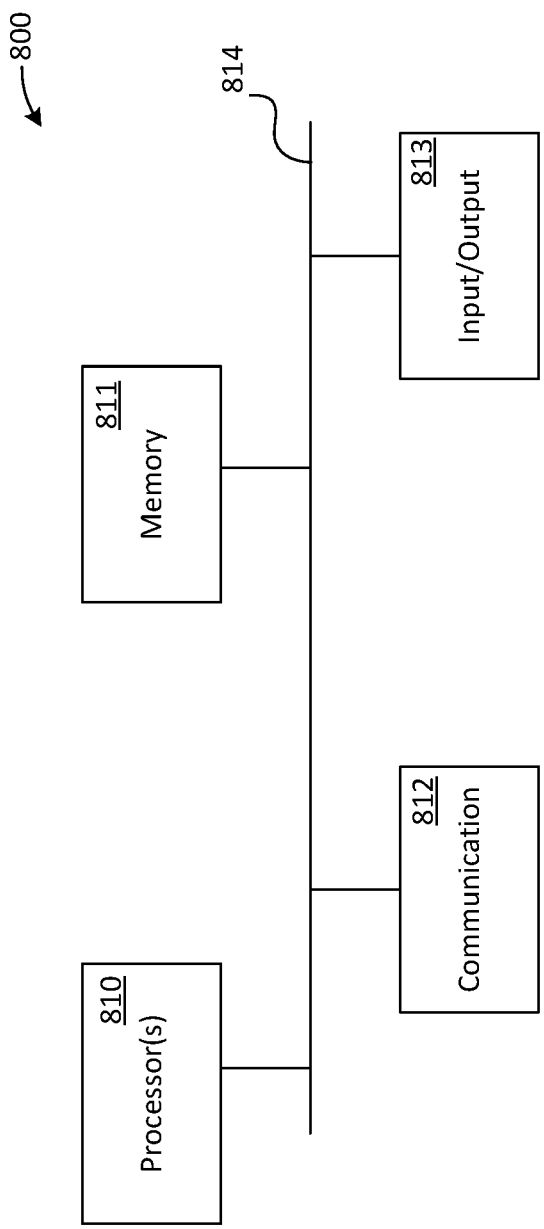
FIG. 8 is a high-level block diagram of a hardware architecture of a processing system that can be used to facilitate payment transactions, such as a POS device.

FIG. 8 illustrates at a high-level an example of the hardware architecture of a processing system that can be used to implement the payment processing system 9, card reader 1, or the POS device 2 (although the implementation would be different for each case). Note that the payment processing system 9 can comprise multiple instances of the architecture shown in FIG. 8 (i.e., multiple computers), which may be coupled to each other via a network or multiple networks. Furthermore, the computer system that implements the payment processing system 9 may perform functions other than facilitating payment transactions.

In the illustrated embodiment, the architecture 800 includes one or more processors 810, memory 811, one or more communication devices 812, and one or more input/output (I/O) devices 813, all coupled to each other through an interconnect 814. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800.

Memory 811 may be or include one or more physical storage devices, which may be in the form of RAM, read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication devices 812 may be or include, for example, an Ethernet adapter, cable modem, Wi-Fi adapter, cellular transceiver, Bluetooth or BLE transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

In the case of the POS device 2, the communication devices 812 can be or include, for example, a cellular telecommunications transceiver (e.g., 3G or 4G/LTE), Wi-Fi transceiver, Bluetooth or BLE transceiver, or the like, or a combination thereof. In the case of the payment processing system 10, the communication devices 812 can be or include, for example, any of the aforementioned types of communication devices, a wired Ethernet adapter, cable modem, DSL modem, or the like, or a combination of such devices. Additionally, the POS device 2 includes a card interface or connector (not shown) that connects to the card reader 1 as described above. The connector can be, for example, a standard audio jack, micro-USB connector, or any other known or convenient type of connector. The card reader 1 is a mechanism for reading data from a payment card and may be, for example, a magnetic stripe reader, smartcard IC chip reader, optical code reader, radio frequency identification (RFID) tag reader, or other similar device.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
a first computing device including one or more processors that execute an application associated with a processing system, the one or more processors executing the application to provide a certificate management function that intercepts security certificates before the security certificates are validated by a security layer of the first computing device, the one or more processors executing the application to perform operations including:
generating a data structure of Secure Sockets Layer (SSL) certificates received by the first computing device from one or more second computing devices, wherein each SSL certificate is associated with a respective second computing device based on a respective transaction initiated on the first computing device, the one or more processors executing the application to generate the data structure by:
receiving, from one of the second computing devices, an SSL certificate for a transaction initiated on the first computing device;
in response to receiving the SSL certificate for the transaction, directing a function call to the certificate management function of the application rather than to the security layer of the first computing device, the certificate management function executed by the one or more processors to:
store the received SSL certificate in the data structure; and
place a function call to the security layer, causing the security layer to receive the SSL certificate; and
in response to a predetermined input, transmit the SSL certificates in the data structure to the processing system for validation, wherein the processing system evaluates a validity of each of the SSL certificates and determines whether a security of the first computing device has been compromised based on whether one or more of the SSL certificates are invalid.

2. The system of claim 1, the operations further comprising modifying an import address table initialized by execution of an operating system of the first computing device, the import address table modified to direct the received SSL certificate to the certificate management function of the application rather than to the security layer of the first computing device.

3. The system of claim 2, wherein a portion of the import address table includes a function address reference that is capable of being altered by an attacker, the operations further comprising generating a checksum of at least the portion of the import address table to determine whether unauthorized modification of the import address table has occurred.

4. The system of claim 3, the operations further comprising generating the checksum based on identifying and remapping a function address reference within the import address table that has been randomly arranged by address space layout randomization.

5. The system of claim 2, the operations further comprising receiving, from the processing system, based on one of the SSL certificates being determined by the processing system to be an invalid certificate, a communication that prevents further transactions with the second computing device corresponding to the invalid certificate.

6. A method comprising:
generating, by a mobile device executing an application on the mobile device, a data structure of one or more security certificates received by the mobile device;
receiving, by the mobile device, from a computing device, a security certificate of the computing device, the security certificate including a public cryptographic key of the computing device and a digital signature;
directing, by the mobile device, a first function call to the application based on receiving the security certificate from the computing device;
storing, by the mobile device, the security certificate in the data structure;
placing, by the mobile device, a second function call from the application to a security layer of the mobile device to cause the security layer to receive the security certificate, the security layer implementing a network security standard to communicate with the computing device based at least on receiving the security certificate; and
transmitting, by the mobile device, one or more of the security certificates included in the data structure to a validation system to determine validity of the one or more security certificates.

7. The method of claim 6, further comprising storing the data structure on a card reader coupled to the mobile device.

8. The method of claim 6, further comprising modifying, by the mobile device, based on execution of the application, an import address table initialized by execution of an operating system on the mobile device, the import address table modified by the execution of the application to direct the received security certificate for performing the storing of the security certificate in the data structure.

9. The method of claim 6, wherein the security certificate is one of a Secure Sockets Layer (SSL) certificate or a Transport Layer Security (TLS) certificate.

10. The method of claim 6, further comprising receiving, by the mobile device, from the validation system, over a computer network, based on the security certificate being determined by the validation system to be an invalid certificate, a communication that prevents further transactions with the computing device.

11. The method of claim 6, wherein, based at least on determining that at least one of the security certificates received from the mobile device is invalid, the validation system determines that security of the mobile device has been compromised.

12. The method of claim 11, wherein, based at least on determining the security of the mobile device has been compromised, the validation system is configured to at least one of: generate a notification; disable the application on the mobile device; or prevent further transactions with at least one computing device corresponding to the at least one invalid security certificate.

13. The method of claim 6, wherein the first function call is directed to the application rather than to the security layer of the mobile device based on the mobile device executing an altered function in an import address table maintained by the mobile device.

14. The method of claim 6, wherein the transmitting the one or more of the security certificates in the data structure to the validation system comprises transmitting a plurality of security certificates in the data structure to the validation system, each security certificate having been received from a different computing device.

15. A non-transitory computer-readable medium storing an application including instructions that are executable by one or more processors of a mobile device to cause the mobile device to perform operations comprising:

receiving, from a computing device, a security certificate for establishing secure communications between the computing device and the mobile device, the security certificate including a public cryptographic key of the computing device and a digital signature;

directing a first function call to the application based on receiving the security certificate from the computing device;

storing, by the mobile device, the security certificate in a security certificate data structure;

based on storing the security certificate in the security certificate data structure, placing a second function call from the application to a security layer of the mobile device to cause the security layer to receive the security certificate, the security layer implementing a network security standard to communicate securely with the computing device based at least on receiving the security certificate; and subsequent to establishing the secure communications between the computing device and the mobile device, transmitting the security certificate stored in the security certificate data structure to a validation system to determine validity of the security certificate.

16. The non-transitory computer-readable medium of claim 15, the operations further comprising modifying, based on execution of the application, an import address table initialized by execution of an operating system on the mobile device, the import address table modified by the execution of the application to direct the received security certificate for performing the storing of the security certificate in the security certificate data structure.

17. The non-transitory computer-readable medium of claim 16, wherein a portion of the import address table includes a function address reference that is capable of being altered by an attacker, the operations further comprising generating a checksum of at least the portion of the import address table to determine whether unauthorized modification of the import address table has occurred.

18. The non-transitory computer-readable medium of claim 15, the operations further comprising generating the security certificate data structure and storing therein a plurality of security certificates including the security certificate, received by the mobile device from a plurality of computing devices, respectively, including the computing device, wherein each security certificate is associated with a respective one of the plurality of computing devices.

19. The non-transitory computer-readable medium of claim 15, wherein the security certificate is one of a Secure Sockets Layer (SSL) certificate or a Transport Layer Security (TLS) certificate.

20. The non-transitory computer-readable medium of claim 15, the operations further comprising receiving, by the mobile device, from the validation system, over a computer network, based on the security certificate determined by the validation system to be an invalid certificate, a communication that prevents further transactions with the computing device.

21. The non-transitory computer-readable medium of claim 15, the operations further comprising directing the first function call to the application rather than to the security layer of the mobile device based on the mobile device executing an altered function in an import address table maintained by the mobile device.

22. The non-transitory computer-readable medium of claim 15, wherein the operation of transmitting the security certificate stored in the security certificate data structure to the validation system is performed based on expiration of a predetermined duration of time.

* * * * *